Feb. 8, 1927.
E. G. YOUNG
PISTON RING
Filed April 10, 1924
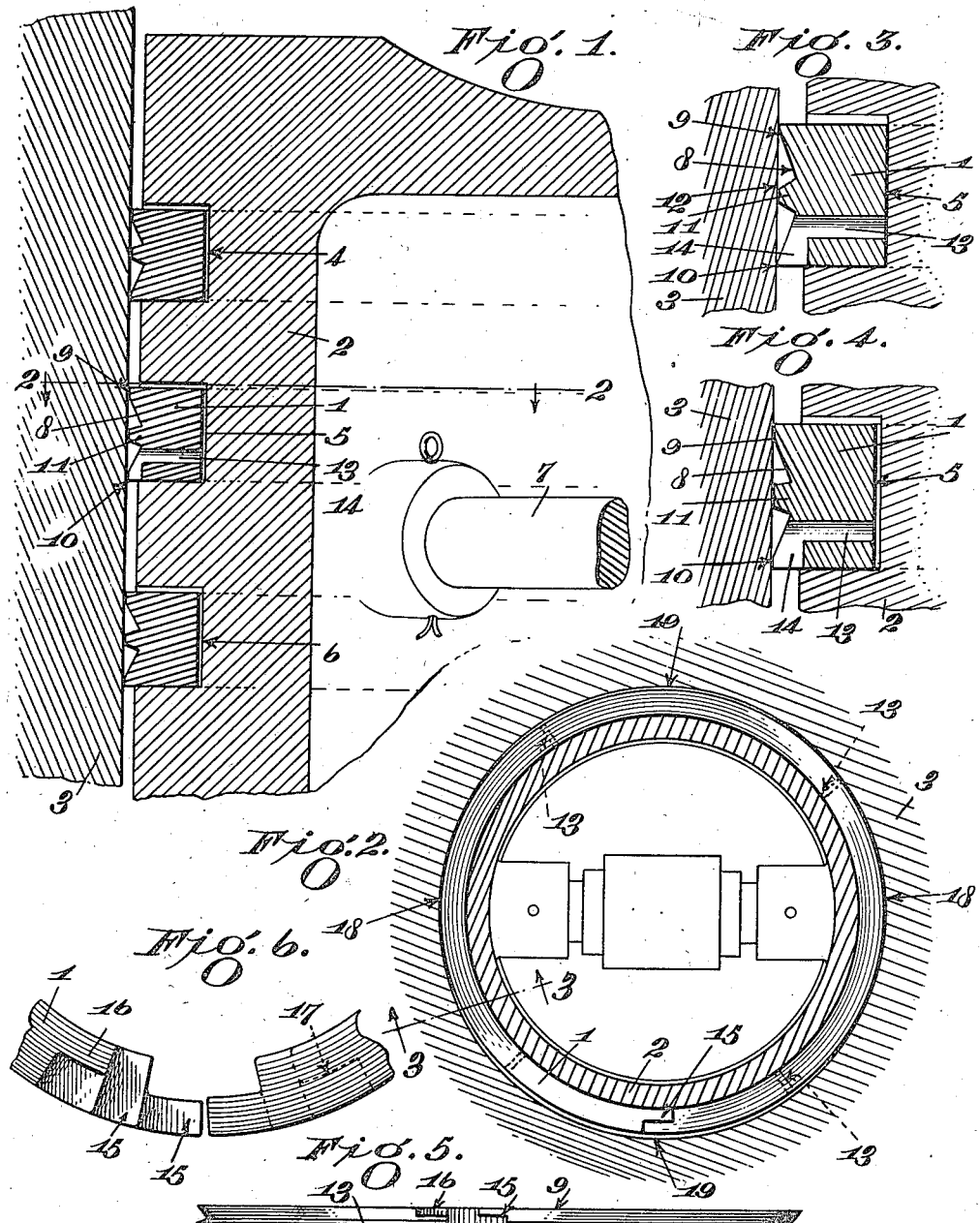

Patented Feb. 8, 1927.

1,617,229

UNITED STATES PATENT OFFICE.

EARL G. YOUNG, OF DECATUR, ALABAMA; ELIZA YOUNG ADMINISTRATRIX OF SAID EARL G. YOUNG, DECEASED.

PISTON RING.

Application filed April 10, 1924. Serial No. 705,575.

My invention relates to improvements in piston rings, and it consists of the constructions, combinations and arrangements herein described and claimed.

An object of the invention is to provide a piston ring with such an arrangement of ducts and ports as to feed back such oil as enters the ring groove from the cylinder wall and thereby prevent the oil from entering the working chamber and fouling of the spark plug of the engine.

Another object of the invention is to provide a piston ring which, in accordance with the foregoing description, produces an automatic oil feed-back action thereby preventing fouling of the spark plug and providing adequate lubrication for the wrist pin.

Another object of the invention is to provide a piston ring which will conform to an irregular configuration of the engine cylinder in a manner fully disclosed below.

Another object of the invention is to provide a piston ring having a novel structure at the adjacent ends for presenting a good joint when the ring is in place.

Other objects and advantages appear in the following specification, reference being had to the accompanying drawing, in which:—

Figure 1 is a sectional view of enough of a piston to illustrate the application of several of the improved rings.

Figure 2 is a section taken substantially on the line 2—2 of Figure 1,

Figure 3 is a section taken on the line 3—3 of Figure 2 showing the original shape of the ring before conformation to the cylinder wall, Figure 4 is a similar view showing the shape of the ring after conformation, Figure 5 is a side elevation of the ring illustrating the particular joint, and Figure 6 is a detail plan view of enough of the ring to again illustrate the adjacent joint.

In carrying out the invention provision is made of a ring 1 which in practice may be made of such metal as is usually employed for the purpose. Three of the rings are ordinarily used on an engine piston such as illustrated at 2 in Figure 1. The piston operates in the engine cylinder 3, and in accordance with practice is slightly spaced from the cylinder wall.

This space is closed, so to speak, by the piston rings in the grooves 4, 5 and 6. These grooves are so arranged that the lowermost grooves 5 and 6 are respectively situated on opposite sides of the wrist pin 7. This is the pin to which the connecting rod of the engine is joined.

Attention is first directed to the ring 1 in the groove 5. According to the original manufacture of the ring the periphery is so dished at 8 as to produce opposite edges 9 and 10 of considerable sharpness and relative weakness, and to leave a central upstanding rib 11. The peripheral surface of this rib is not sharp like the edges 9 and 10 but is left slightly flat, as indicated at 12.

It is intended that the edges 9 and 10 and the rib 11 shall be worn down upon initially burning in the piston ring. This is more fully described later in connection with Figure 2. There is usually enough room in the groove 5 for a slight play of the piston ring during the reciprocation of the piston. This action of the ring is taken advantage of in returning the oil from the groove 5 into the direction of the crank case. For this purpose the ring 1 has a plurality of ducts 13 which traverse the ring and communicate with ports 14 directed downwardly at places adjacent to the edge 10. Oil entering the groove 5 instead of being pumped out over the upper edge of the ring upon an upstroke of the piston will be forced into the ducts 13 and out of the ports 14 back to the wall of the cylinder 3. This action prevents the entrance of oil into the working chamber of the engine with the result that there will be no accumulation of soot around the electrodes of the spark plug.

It is to be observed that this specially made ring is situated in the groove 5 immediately above the wrist pin 7. There is a purpose in doing this. The ring 1 functions to keep a supply of oil on the cylinder wall in the region adjacent to the ends of the pin 7. There will, therefore, always be a supply of oil for the wrist pin. It is not particularly necessary that the other rings in the grooves 4 and 6 be provided with oil ducts and ports. These rings are identical with the ring 1 with the exception of such ducts and ports, and are intended to function the same so far as the self-conforming feature is concerned.

All of the rings have joints as illustrated in Figures 5 and 6. Of necessity each ring is split. The adjoining ends of the ring 1 (Fig. 5) are cut away to form steps 15. The steps fit together when the ring is fully compressed. Three steps are shown on each end, but more or less may be employed if deemed advisable.

The uppermost step 15 on the left side of the opening (Fig. 5) is closed by a wall 16. Similarly, the lowermost step on the right is closed by a wall 17. The remaining and central steps extend through the full thickness of the ring. Those steps opposite the walls 16 and 17 are reduced in thickness so that they may fit in the spaces left by the walls. By virtue of this arrangement the diagonally opposite steps really produce tongues which occupy the spaces left by the walls 16 and 17.

*The operation.*

Consider first the self-conforming feature of the piston ring. The description of the action of one ring will suffice for all because the action is the same in each instance. Figure 2 shows a part of an engine cylinder 3 in which the wall has been worn out of shape by the action of the piston. The bore 18 is enlarged at 19, thereby presenting an oval rather than a circular piston opening. This disfiguration of the bore usually occurs in a plane at right angles to the axis of the engine shaft, and is commonly attributed to the "slapping" of the piston against the cylinder.

Upon fitting the improved piston ring upon a piston 2 in an old cylinder the joint (Fig. 5), is brought together fully as shown in Figure 2. Obviously there will be places where the ring touches the bore and other places where spaces occur. This is due to the disfiguration of the bore.

It is now that the sharp edges 9 and 10 and the relatively narrow rib 11 function. Upon operating the piston for a short time, it will be found that the relatively thin edges 9 and 10 and the ribs 11 will wear down at the sides 18 (Fig. 2) of the bore until they assume a shape somewhat as shown in Figure 4. This wear continues until the ring has expanded sufficiently to completely fill the space at the oval places 19.

The engine will be found to work hard at first. This is due to the wearing action which is going on upon the piston rings. As soon as the wearing action is over the engine will be found to work even better than usual because the spaces at the places 19, which ordinarily permit the loss of compression, will be nicely filled. The foregoing action occurs largely when ring replacements are made in old engines. There is not so much occasion for self-conformation of rings in a new engine because there the cylinder bores are true.

Now as to the oiling feature: It has been explained that there is always a slight up and down movement of the rings in the respective grooves. In practice this movement actually causes a pumping of oil from one groove to the next, finally discharging above the piston into the working chamber. It is the presence of oil that causes a smoky exhaust and a fouling of spark plugs.

Pumping of oil will be prevented at that one of the grooves in which a ring having ducts 13 and ports 14 is situated. It is, therefore, preferable that a ring of this particular kind be placed in the groove 5 immediately above the wrist pin 7. The reader can readily imagine the ring 1 as riding upward in the groove 5 upon a down stroke of the piston 2.

Such riding of the ring will scrape oil from the cylinder wall. The oil will naturally tend to enter the groove 5 from beneath. Upon the next and upward stroke of the piston the ring 1 will ride downward. The tendency will be to squeeze the oil upward in the groove 5. Were it not for the presence of the ducts 13 this oil would actually escape at the top and by a recurrence of the foregoing action would finally escape above the ring in the groove 4 and ultimately enter the working chamber.

However, the ducts 13 and ports 14 immediately stop such tendency because the oil will escape at these places and again reach the cylinder wall. It is conceivable that considerable oil will be secreted between the rings in the grooves 5 and 6, thus providing a good supply of oil for the ends of the wrist pin 7.

While the construction and arrangement of the improved piston ring as herein described and claimed is that of a generally preferred form, obviously modifications and changes may be made without departing from the spirit of the invention or the scope of the claim.

I claim:—

A piston ring having a peripherally dished surface divergingly sloping outward and producing relatively sharp and thin edges at opposite sides of the ring, a central peripheral rib at the base of the dish having a relatively narrow elliptical surface, said ring having a plurality of ducts traversing it below the rib, the outer ends of said ducts terminating in downwardly extending ports which extend through the adjacent thin edge to provide an unobstructed oil outlet.

EARL G. YOUNG.